(12) United States Patent
Becker Hof et al.

(10) Patent No.: US 7,420,973 B2
(45) Date of Patent: Sep. 2, 2008

(54) CONTEXT SELECTION IN A NETWORK ELEMENT THROUGH SUBSCRIBER FLOW SWITCHING

(75) Inventors: Onno Mark Becker Hof, Zoetermeer (NL); Said Ouissal, Amsterdam (NL)

(73) Assignee: Redback Networks Inc., San Jose, CA (US)

( * ) Notice: Subject to any disclaimer, the term of this patent is extended or adjusted under 35 U.S.C. 154(b) by 840 days.

(21) Appl. No.: 10/775,286

(22) Filed: Feb. 9, 2004

(65) Prior Publication Data

US 2005/0175001 A1    Aug. 11, 2005

(51) Int. Cl.
*H04L 12/28* (2006.01)
*H04L 12/66* (2006.01)
*G01R 31/08* (2006.01)
*G06F 15/173* (2006.01)
*G06F 15/16* (2006.01)
*G06F 12/00* (2006.01)

(52) U.S. Cl. .................. 370/392; 370/352; 370/389; 370/218; 709/238; 709/229; 707/202; 707/204

(58) Field of Classification Search ............... 711/226, 711/227, 228; 370/400, 401, 352, 390, 389, 370/392, 395.2, 395.31, 218, 219, 220, 468, 370/395.21, 395.4; 709/203, 201, 224, 229, 709/238, 226, 227, 228; 707/202, 204
See application file for complete search history.

(56) References Cited

U.S. PATENT DOCUMENTS

| | | | |
|---|---|---|---|
| 6,154,777 A * | 11/2000 | Ebrahim | ............ 709/227 |
| 6,226,751 B1 | 5/2001 | Arrow et al. | |
| 6,339,595 B1 | 1/2002 | Rekhter et al. | |
| 6,463,061 B1 | 10/2002 | Rekhter et al. | |
| 6,526,056 B1 | 2/2003 | Rekhter et al. | |
| 6,609,153 B1 | 8/2003 | Salkewicz | |
| 6,662,221 B1 | 12/2003 | Gonda et al. | |
| 6,807,181 B1 * | 10/2004 | Weschler | ............ 370/400 |
| 7,161,914 B2 * | 1/2007 | Shoaib et al. | ............ 370/331 |
| 2001/0016914 A1 | 8/2001 | Tabata | |
| 2002/0090089 A1 | 7/2002 | Branigan et al. | |
| 2003/0041136 A1 | 2/2003 | Cheline et al. | |
| 2004/0034797 A1 | 2/2004 | Becker Hof | |

OTHER PUBLICATIONS

"Access Operating System (AOS) Configuration Guide—Release 3.1, Part No. 220-0122-01." Redback Networks Manual, copyright 1992-1998, Redback Networks, Inc.

(Continued)

*Primary Examiner*—Hanh Nguyen
(74) *Attorney, Agent, or Firm*—Blakely, Sokoloff, Taylor & Zafman, LLP (57) ABSTRACT

Context selection in a network element through subscriber flow switching. According to one embodiment of the invention, authentication, authorization and accounting is performed for a subscriber desiring to connect to a plurality of services on different contexts. In response, bindings are established to a plurality of contexts for the subscriber. In response to receiving a traffic packet from the subscribed, at least certain header information from the traffic packet is accessed. Based on at least the accessed header information, one of the plurality of contexts is selected for that traffic packet.

14 Claims, 8 Drawing Sheets

OTHER PUBLICATIONS

Becker Hof, Onno, et al. "Method and Apparatus for Agnostic PPP Switching." U.S. Appl. No. 10/600,192 filed Jun. 20, 2003.
PCT/US02/36832, mailed Feb. 14, 2003.
PCT/US02/36832, mailed Aug. 19, 2003.
PCT/US02/36832, mailed Aug. 17, 2004.
Wilder, R., et al., "Layer 3 Virtual Private Networks (l3vpn)", Charter. Last modified Sep. 20, 2005, 4 pgs. l3vpn@ietf.org.
Rosen, E., RFC 2547 entitled, "BGP/MPLS VPNs", Mar. 1999. Copyright The Internet Society, 24 pgs.
Kirton, P., RFC 911 entitled, "EGP Gateway Under Berkeley UNIX 4.2", Aug. 22, 1984, 20 pages. University of Southern California, Information Sciences Institute Visiting Research Fellow from Telecom Australia Research Laboratories.

* cited by examiner

CONTEXT SELECTION IN A NETWORK ELEMENT THROUGH SUBSCRIBER FLOW SWITCHING

CROSS-REFERENCE TO RELATED APPLICATIONS

Not Applicable.

BACKGROUND OF THE INVENTION

Figure 1:
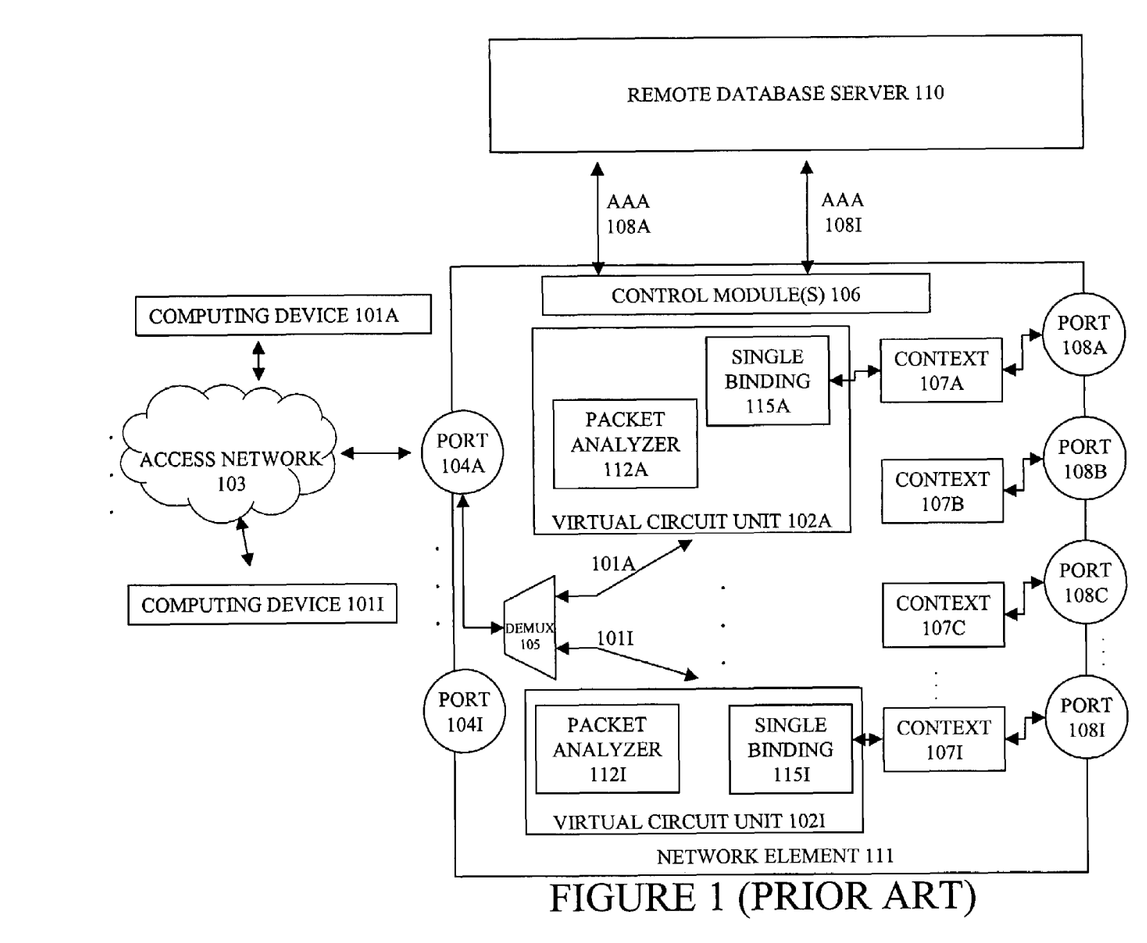
FIG. 1 illustrates a network element for establishing single bindings according to the prior art.

FIG. 1 illustrates a network element for establishing single bindings according to the prior art. FIG. 1 illustrates the network element 111 (e.g., the SMS™ Platform and/or SmartEdge® Platform sold by Redback Networks, Inc. of San Jose, Calif.) having a number of ports 104-104I and 108A-108I, a layer 2 demultiplexer unit 105, a remote database server 110, a number of virtual circuit units 102A-I, a set of one or more control modules 106, and a number of contexts 107A-I. Each of the contexts 107A-I provides the functionality of a router (e.g., a layer 3 router supporting at least the Internet protocol (IP)), and thus operate as virtual routers in the network element 111. Depending upon the configuration of the network element 111, each context 107A-I can be associated with a different provider or service (e.g., video service, on-line gaming service, an Internet service provider, a content provider, etc.) through output ports 108-108I to allow for separation of traffic of different services (e.g., for accounting and other purposes). However, a different or additional allocation of contexts may also be possible (e.g., different services of a given provider may be allocated to different contexts, certain providers may share a single context, etc.). A given context may include a number of subnets that comprise a number of addresses (e.g., Internet Protocol (IP) addresses) that are to be dynamically assigned to subscriber/clients.

By way of example, a number of computing devices 101A-I are coupled to the port 104A by an access network 103. In contrast, the ports 108A-I are used for communication by the contexts to the services. It should be understood that any number of ways can provide communication between the ports 108A-I and external services according to well known techniques (e.g., a connection over the Internet, such as a virtual private network (VPN) using, for example, GRE tunneling, L2TP tunneling, ATM/FR logical channels, 802, 1Q VLANS, direct IP connectivity, MPLS L2/L3 VPNS etc).

Different communication sessions between the computing devices 101A-I may travel through different ones of the contexts 107A-I. Thus, each of the contexts 107A-I have one or more interfaces to provide communication out of port(s) 108, and also have one or more interfaces to which the computing devices may be bound depending upon the service that has been selected by a subscriber. While in FIG. 1, each context is associated with one of ports 108A-I, other configurations are possible (e.g., a given context may be associated with multiple ports 108A-I; different contexts may be associated with the same set or overlapping sets of one or more ports 108A-I; etc.). The control modules 106 handle various communications, protocols, network connections, bindings, etc.

The remote database server 110 stores data related to authentication, authorization and accounting (AAA) for subscribers. While in one embodiment, the remote database server 110 is a Remote Access Dial In User Server (RADIUS) server (e.g., with a sequel (SQL) database, such as MySQL), alternative embodiments may use additional RADIUS servers and/or instead or additionally use other types of servers. It should be understood that any number of ways can be used for providing communication between the remote database server 110 and the network element 111 according to well known techniques (e.g., a connection over the Internet, such as a VPN carrying a software program/script (e.g., perl based scripting) for RADIUS attribute/element modification and Pre-emptive Hypertext Processor (PHP) based web interfacing to link the necessary databases of both).

The access network 103 represents any number of different access networks using any number of different types of encapsulations, including channelized media (e.g., DSL) and non-channelized media (common for cable modem services). For example, the point-to-point protocol (PPP) is commonly used for DSL services. PPP requires a client to be installed on the computing devices that allow a subscriber to enter a username and a password, which in turn may be used to select a context. As another example, when Dynamic Host Configuration Protocol (DHCP) is used (e.g., for cable modem services), a username typically is not provided by the computing device; but in such situations the Media Access Control (MAC) address of the hardware in the computing device (or customer premise equipment modem) is provided. The use of DHCP and clientless internet protocol (IP) selection (CLIPS) on the network element allows capture of a MAC address automatically on any DHCP state change occurring in the connection between a computing device and the network element. This MAC address may be used to distinguish subscribers so that contexts may be selected for them based on data in the remote access server. As yet another example, a protocol agnostic technique for context selection called domain-less service selection may be used to select contexts (see application Ser. No. 20/464,233; filed Jun. 17, 2003).

Additionally, FIG. 1 illustrates exemplary operations for computing devices 101A and 101I. FIG. 1 illustrates a given computing device 101A and another given computing device 101I communicatively coupled to the network element 111 through access network 103 and port 104A. The layer 2 demultiplexer unit 105 is coupled to port 104A and represents well known hardware, software, and/or firmware for separating a multiplexed signal carrying packets from one or more subscribers. In FIG. 1, layer 2 demultiplexer unit 105 communicates: 1) the data packets of computing device 101A with virtual circuit unit 102A; and 2) the data packets of computing device 101I with virtual circuit unit 102I. A virtual circuit unit is software, hardware, and/or firmware established for a particular subscriber session (When a subscriber session is complete, the associated virtual circuit unit is typically torn down). In FIG. 1, virtual circuit unit 102A and virtual circuit unit 102I are populated through AAA 108A and AAA 108I respectively. Furthermore, virtual circuit unit 102A and virtual circuit unit 102I respectively include packet analyzers 112A and 112I (well known software, hardware and/or firmware to access header information from packets) to provide quality of service and/or access control list operations. The virtual circuit unit 102A and virtual circuit unit 102I respectively include single bindings 115A and 115I. The virtual circuit unit 102A is bound to the context 107A by the single binding 115A. The virtual circuit 102I is bound to the context 107I by the single binding 115I. Virtual circuit units may include additional functions (e.g., quality of service, access control lists, etc.).

As illustrated in FIG. 1, the network element 111 is restricted to single bindings, meaning a particular subscriber is bound to only one context at a time through a network device 111. Since, FIG. 1 requires subscribers to be bound to only one context, a particular subscriber on computing device 101A is unable to switch between services accessed through different contexts without reauthorization (e.g., requiring the subscriber to logout and login again). When a subscriber on computing device 101A attempts reauthorization in order to access a service through a different context, the subscriber must be unbound from their current context and be bound with the other context.

Figure 2:
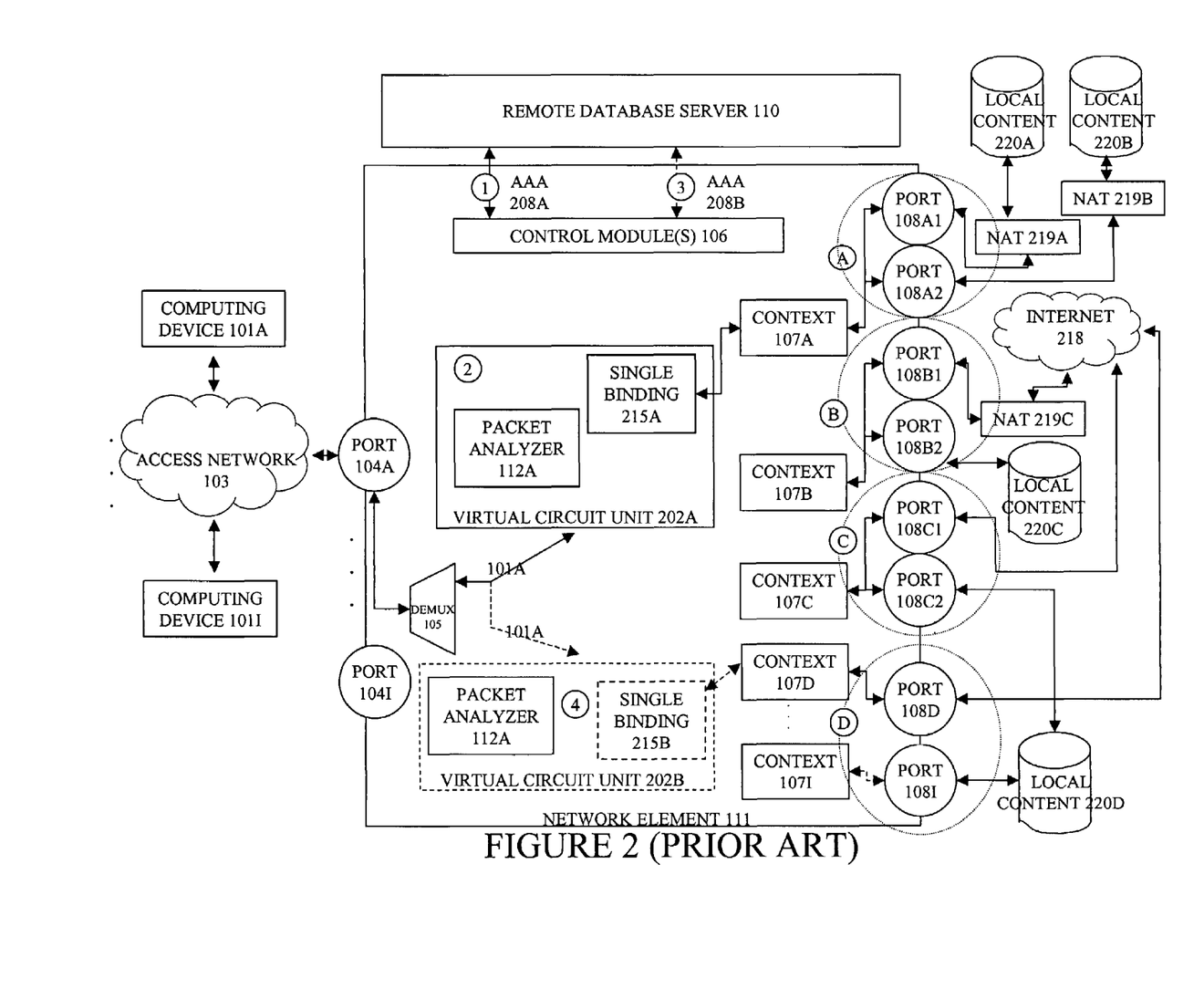
FIG. 2 is a time based data flow diagram illustrating an exemplary use of reauthorization to provide access for computing device 101A to the Internet 218 and to local content 221 at different times through network element 111 according to the prior art.

FIG. 2 is a time based data flow diagram illustrating an exemplary use of reauthorization to provide access for computing device 101A to the Internet 218 and to local content 220A-B at different times through network element 111 according to the prior art. Since the Internet 218 and the local content 220A-B are accessed through different contexts of the network element 111 in FIG. 2, the network element 111 in FIG. 2 requires that computing device 101A switch contexts to access either the Internet 218 or local content 220A-B. Specifically, FIG. 2 illustrates as an example the switch from the Internet to local content using the time phases shown by circled numbers 1-4. Circled numbers 1-2 correspond to the first authorization sequence of computing device 101A to network element 111, and circled numbers 3-4 correspond to the reauthorization sequence of the same computing device 101A to network element 111. Note that local content 220A-D often has different characteristics (e.g. timing demands, bandwidth demands, etc.) than typical Internet traffic. For example, local content can include streaming video, online computer gaming, voice over IP, etc. To provide relatively better quality of transmission, local content is often stored geographically close to a network element 111.

During the first authorization sequence in FIG. 2, the network element 111 receives a data signal from computing device 101A and the control module 106 negotiates with the remote database server 110 for authentication, authorization and accounting (AAA) information 208A. A single binding 215A in the virtual circuit unit 202A is established as a result of AAA negotiation for the computing device 101A (see circled 1). When traffic packets are received from computing device 101A, a source decision is made and packets are transmitted to context 107A according to the single binding 202A (see circled 2). Context 107A uses port 108A1 and/or 108A2 to establish communication between computing device 101A to local content 220A and/or local content 220B. At this time, the computing device 101A can access the local content 220A and local content 220B, but cannot access the Internet 218. When the subscriber on computing device 101A wants to access the Internet 218 through context 107D, the subscriber must be unbound from context 107A and reauthorize to be bound with the context 107D whether or not the subscriber is finished using local content 220A and/or local content 220B.

Specifically, during the reauthorization sequence in FIG. 2, the network element 111 receives a data signal from computing device 101A and the control module 106 negotiates with the remote database server 110 for authentication, authorization and accounting (AAA) information 208B. A single binding 215B in virtual circuit unit 202B is established as a result of AAA negotiation for the computing device 101A (see circled 3). When traffic packets are received from computing device 101A, they are transmitted to context 107D according to the single binding 215B (see circled 4). Context 107D uses port 108D to establish communication between computing device 101A to Internet 218. At this time, the computing device 101A can access the Internet 218, but cannot access local content 220A and/or 220B.

In contrast, FIG. 2 also illustrates four exemplary configurations (circled A-D) to provide access for computing devices 101A-I to the Internet 218 and/or to local content 220A-D through network element 111 according to the prior art.

First, circled A shows a configuration in which context 107A uses ports 108A1 and 108A2 to communicate to local content 220A and/or local content 220B through network access translation (NAT) device 219A and network access translation (NAT) device 219B respectively. Disadvantageously, this configuration is relatively not scalable because it requires NAT devices for each local content connected to a port. Furthermore, disadvantageously, this configuration requires a high context configuration complexity (because it provides access to services on two ports). In addition, since a NAT device assigns port information, a NAT device is not source or destination port transparent (e.g., it cannot take advantage of port numbers used for on-line gaming). It should be noted that the word "port" when referring to a NAT device is different than the ports when discussing network element 111. The ports when discussing the network element 111 are physical ports 104-104I and 108A-108I. Physical ports are not to be confused with source and destination ports as indicated within packet headers or as referred to in conjunction with network access translation (NAT) devices.

Second, circled B shows a configuration in which context 107B uses ports 108B1 and 108B2 to communicate to the Internet 218 through NAT device 219C and to local content 220C. Disadvantageously, similar to configuration circled A, this configuration is relatively not scalable because it requires NAT devices for each local content connected to a port. Furthermore, disadvantageously, this configuration requires a high context configuration complexity (because it provides access to services on two ports).

Third, circled C shows a configuration in which context 107C uses ports 108C1 and 108C2 to communicate to the Internet 218 and to local content 220D. Circled C has the advantage of being scalable because it does not use a NAT device, however it is less secure because the local content 220D can be accessed over the Internet through the network element 111. In addition, configuration C still suffers from a high context configuration complexity (because it provides access to services on two ports).

Forth, circled D shows a configuration in which context 107D uses port 108D to communicate to the Internet 218 and context 107I uses port 108I to access local content 220D. The configuration shown in circled D would require a subscriber wanting to access both the Internet 218 and local content 220D through network element 111 to re-authenticate in order to switch between the Internet 218 and local content 220D. As a result, disadvantageously, simultaneous access of the Internet 218 and local content 220D is not possible with this configuration.

BRIEF SUMMARY OF THE INVENTION

Context selection in a network element through subscriber flow switching is described. According to one embodiment of the invention, authentication, authorization and accounting is performed for a subscriber desiring to connect to a plurality of services on different contexts. In response, bindings are established to a plurality of contexts for the subscriber. In response to receiving a traffic packet from the subscribed, at least certain header information from the traffic packet is accessed. Based on at least the accessed header information, one of the plurality of contexts is selected for that traffic packet.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details such as logic implementations, opcodes, means to specify operands, resource partitioning/sharing/ and duplication implementations, types and interrelationships of system components, and logic partitioning/integration choices are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

Exemplary embodiments of the invention will now be described with reference to FIGS. 3-9. In particular, the operations of the flow diagrams 5-8 will be described with reference to the exemplary embodiments of FIGS. 3 and 4. However, it should be understood that the operations of these flow diagrams can be performed by embodiments of the invention other than those discussed with reference to FIGS. 3 and 4, and that the embodiments discussed with reference to FIGS. 3 and 4 can perform operations different than those discussed with reference to these flow diagrams.

Figure 3:
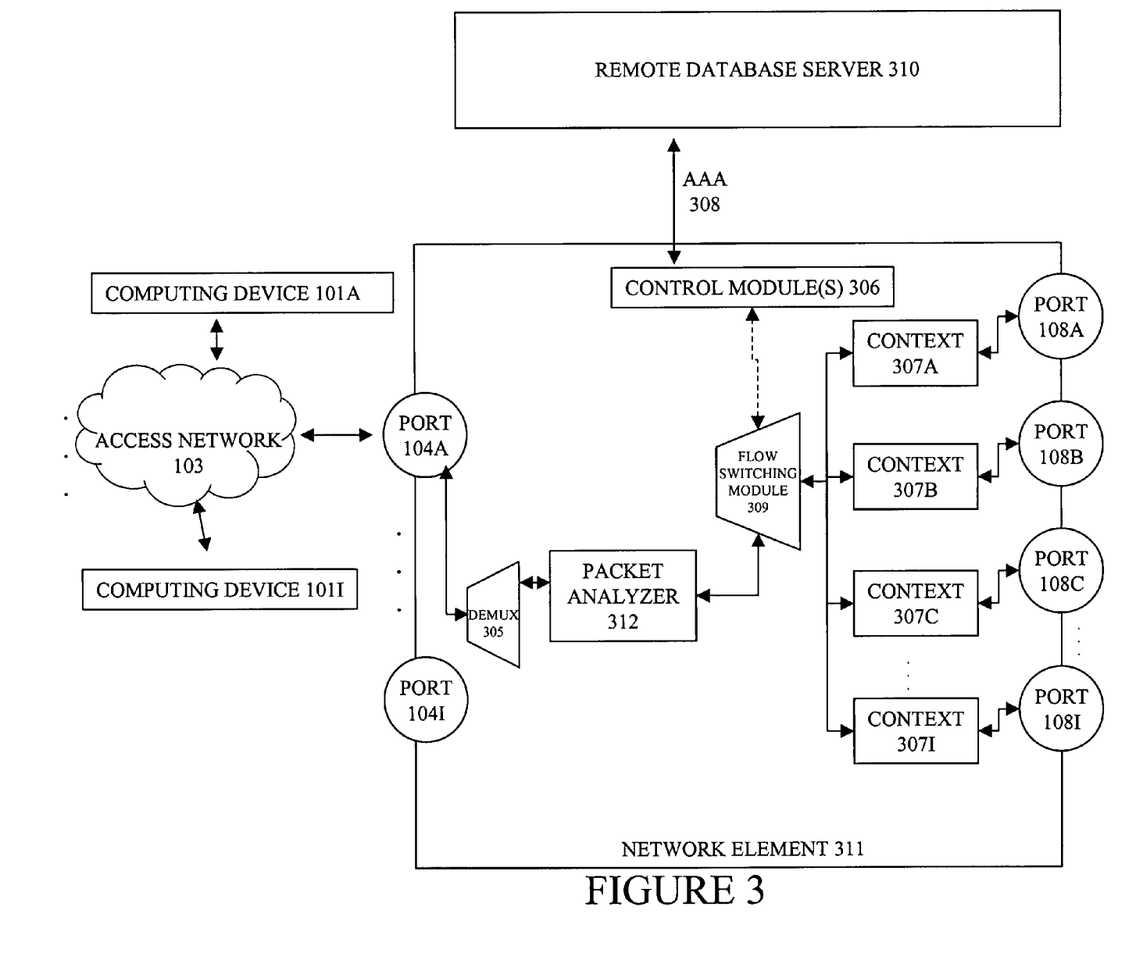
FIG. 3 is a conceptual diagram illustrating a use of subscriber flow switching in a network element to provide a computing device simultaneous access to services through different contexts according to one embodiment of the invention.

FIG. 3 is a conceptual diagram illustrating a use of subscriber flow switching in a network element to provide a computing device simultaneous access to services through different contexts according to one embodiment of the invention. FIG. 3 illustrates a remote database server 310 and a network element 311 having a number of ports 104-104I and 108A-108I, a layer 2 demultiplexer unit 305, a packet analyzer 312, a flow switching module 309, a set of one or more control modules 306, and a number of contexts 307A-I. It should be understood that the orientation and representation of the ports of network element 311 are simply for illustration purposes, and thus they are not restrictive upon the scope of the invention. The remote database server 310, layer 2 demultiplexer unit 305, contexts 307A-I, control modules 306, and/or packet analyzers 312A-I may be similar to or the same as the similarly named element in FIG. 1 or 2. For instance, while FIG. 3 illustrates that the network element 311 and the remote database server 310 as two separate elements, other embodiments of the invention are not so limited (e.g., the database server 310 and/or the records therein can be incorporated into the network element 311). Furthermore, the authorization sequence for a subscriber on one of computing devices 101 maybe similar to or the same as in the network element 111 in FIG. 1 or 2. In addition, the different configurations discussed with reference to the network element 111 are also applicable to the network element 311 in certain embodiments of the invention.

In FIG. 3, the computing devices 101A-I are communicatively coupled to port 104A of the network element 311 through the access network 103. The layer 2 demultiplexer unit 305 is coupled to port 104A and the packet analyzer 312. During the first authorization sequence in FIG. 3, the network element 311 receives a data signal from one of computing device 101A-I and the control module 306 negotiates with the remote database server 310 for authentication, authorization and accounting (AAA) information 308. In one embodiment of the invention, the flow switching module 309 is established as a result of the AAA procedure. The packet analyzer 312 accesses at least certain header information from each incoming packet and provides this header information to the flow switching module 309. In one embodiment of the invention, the packet analyzer 312 may access all or part of the header information from each incoming packet. The packet analyzer may send the entire header of a packet to the flow switching module, or may send only a subset of the header information.

The flow switching module 309 represents software, hardware, and/or firmware that associates header information based bindings with the contexts 307A-I. Different ones of these bindings associate different header information values to different contexts. In other words, each binding associates a set of one or more header information values (values for one or more of the fields of a packet header (e.g., in an IP packet, the source address, the source port, the destination address, the destination port, etc.)) to a context. While in certain embodiments of the invention each binding may identify header information values for the same header fields, in alternative embodiments of the invention different bindings may identify header information values for different or overlapping sets of header fields. Regardless, based on these bindings, different packets received from the computing devices (including from the same subscriber at the same computing device) are communicated to different ones of the contexts 307A-I based on their header information.

Whereas in the network element of FIGS. 1 and 2 a subscriber had to reauthorize in order to access different services through different contexts (and the manner of reauthorization is often dependent on the protocol used between the computing devices and the network element 111), the embodiment of the invention in FIG. 3 overcomes this requirement through the flow switching module 309. By determining a context for each packet based on that packet's header information, the embodiment of the invention in FIG. 3 does not require reauthorization to provide a given subscriber access to different contexts. In other words, the network element 311 can dynamically communicate packets from a subscriber to different contexts by associating different header information values to different contexts, examining header information of incoming packets, and communicating those packets to contexts according to the associations. Furthermore, the network element 311 allows a subscriber to simultaneously access services through different contexts because the network element 311 enables multiple bindings for a subscriber rather than a single binding as in the network element 111 of FIGS. 1 and 2. Furthermore, since reauthorization is not required to access different contexts, any differences in the manner of reauthorization due to the protocol used between the computing devices and the network element (e.g. PPP, DHCP, 1483 bridged, etc.) are avoided (that is, the flow switching is protocol agnostic with respect to the protocol used between the computing devices and the network element).

While in one embodiment of the invention, a value or range of values must be provided for each binding (where a match is not found for a packet, the packet is handled based on the implementation—e.g., dropped, communicated to a catch all context, etc.), other embodiments of the invention use a default binding. For example, in one embodiment of the invention, the flow switching module 309 establishes one primary binding (e.g., a binding to the context of an ISP), and one or more secondary bindings (e.g., bindings to one or more of local content, a content provider over the Internet, a VPN, etc.). The secondary bindings associate particular header information values to a number of secondary contexts. When traffic packets from a computing device 101A-I are received from the packet analyzer 312, the flow switching module 309 determines if the header information of each packet is associated with one of the secondary bindings. If an association with a secondary binding is determined for a particular traffic packet's header, the flow switching module 309 communicates the traffic packet to the context associated with the matching secondary binding. If no association with a secondary binding is made, the flow switching module communicates the traffic packet to the context associated with the primary binding. Thus, the primary binding operates as a default binding (the context of the primary binding acts as a default context) and the secondary bindings operate as exceptions.

While in FIG. 3 one packet analyzer 312A is shown within network element 311, other embodiments may use different techniques (e.g., multiple packet analyzers—one per port, one per line card, one per subscriber, etc.). In addition, while in FIG. 3 one flow switching module is shown within network element 311, other embodiments may use different techniques. For example, other embodiments of the invention may have multiple flow switching modules (e.g., one per subscriber (further described with reference to FIG. 4), one per port, one per line card, etc.). While in one embodiment that has multiple flow switching modules, the bindings in each is the same; in other embodiments of the invention with multiple flow switching modules, different ones of these flow switching modules may have different bindings (e.g., they may vary on a per subscriber basis, per port basis, etc.). For instance, in one embodiment of the invention with primary/secondary bindings and multiple flow switching modules that may have different bindings, the flow switching modules may have different bindings on a per context basis (the context of the primary binding determines the flow switching module used). Furthermore, the flow switching module(s) may be established through a number of different mechanisms (e.g., preprogrammed in the network device, as a result of AAA 308 as illustrated by the dashed line between control module 306 and flow switching module 309 in FIG. 3, dynamically configurable through an interface (e.g., CLI), provided from the remote database server, etc.).

Figure 4:
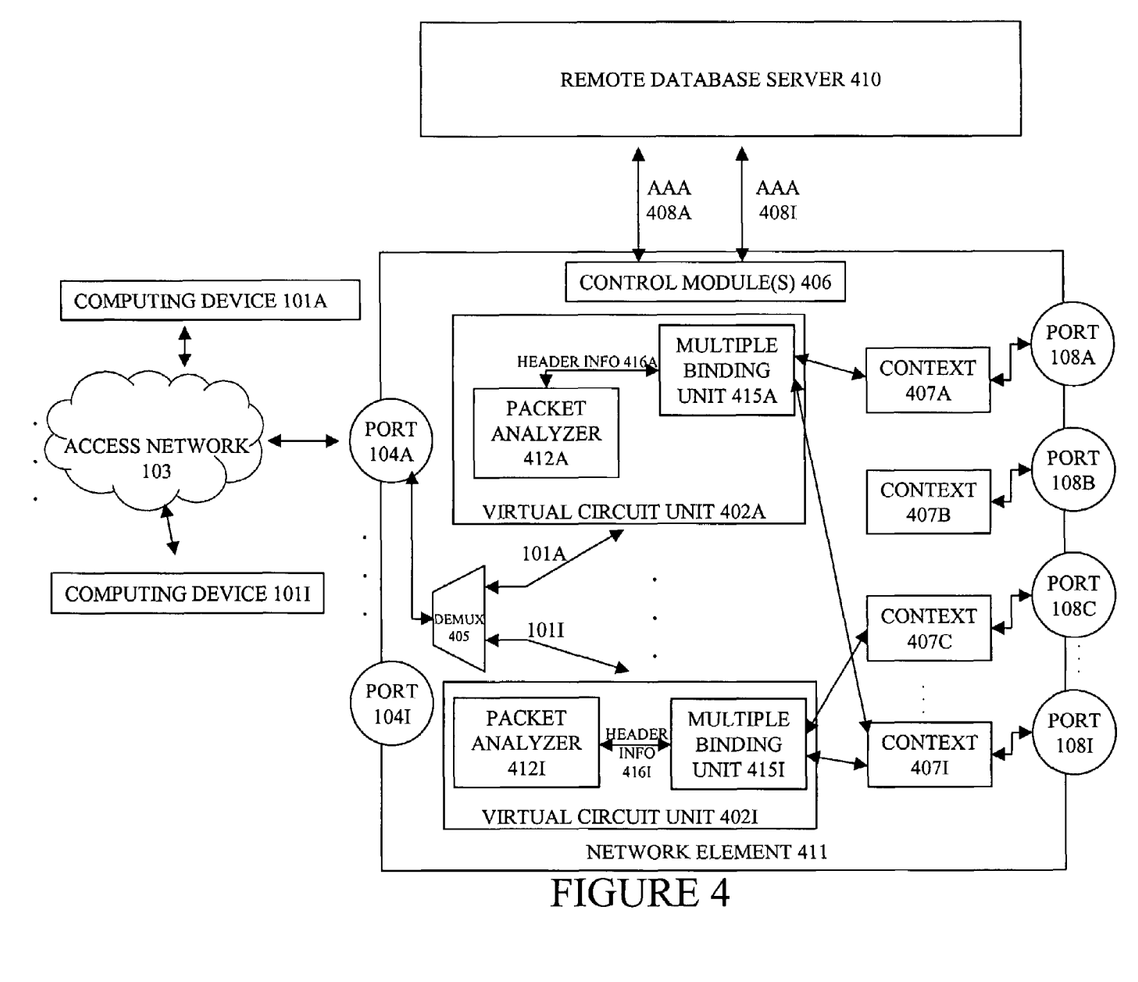
FIG. 4 illustrates a network element for establishing multiple bindings according to one embodiment of the invention.

FIG. 4 illustrates a network element for establishing multiple bindings according to one embodiment of the invention. FIG. 4 illustrates a remote database server 410 and a network element 411 having a number of ports 104A-104I and 108A-108I, a layer 2 demultiplexer unit 405, a number of virtual circuit units 402A-I, a set of one or more control modules 406, and a number of contexts 407A-I. FIG. 4 shows the ports 104-104I and 108A-108I, the layer 2 demultiplexer unit 405, and the contexts 407A-I coupled in the same manner as in the network element 311 in FIG. 3. The remote database server 410, layer 2 demultiplexer unit 405, contexts 407A-I, control modules 406, and/or packet analyzers 412A-I may be similar to or the similarly names elements in FIG. 1, 2, or 3. For instance, while FIG. 4 illustrates that the network element 411 and the remote database server 410 as two separate elements, other embodiments are not so limited (e.g., the database server 410 and/or the records therein can be incorporated into the network element 411). Furthermore, the authorization sequence for a subscriber on one of computing devices 101 may be similar to or the same as in the network element in FIG. 1, 2 or 3. During the first authorization sequence in FIG. 4, the network element 411 receives a data signal from computing device 101A and the control module 406 negotiates with the remote database server 410 for authentication, authorization and accounting (AAA) information 408A. A multiple binding 415A in the virtual circuit unit 402A is established as a result of AAA negotiation for the computing device 101A. In addition, the different configurations discussed with reference to the network elements 111 or 311 are also applicable to the network element 411 in certain embodiments of the invention. In addition, FIG. 4 shows the virtual circuit units 402A-I including multiple binding units 415A-I coupled with the packet analyzers 412A-I.

In FIG. 4, the computing devices 101A-I are communicatively coupled to port 104A of the network element 411 through the access network 103. The layer 2 demultiplexer unit 405 is coupled to port 104A and the virtual circuit units 402A-I to provide a given computing devices packet traffic to its corresponding one of the virtual circuit units 402A-I. The virtual circuit units 402A-I receive traffic packets from subscribers (through layer 2 demultiplexer unit 405) and processes header information for each packet in order to communicate the packets to one of the contexts 407A-I.

The packet analyzers 412A-I access at least certain header information from each incoming packet and provide this header information to the multiple binding unit 415A-I within the same virtual circuit unit 402A-I. The packet analyzers 412A-I in FIG. 4 receive traffic packets from computing devices 101A-I. While there is one packet analyzer 412A-I in each virtual circuit unit A-I according to one embodiment of the invention, alternative embodiments of the inventions may use other techniques (e.g., only one packet analyzer for the network element, one packet analyzer per line card, one packet analyzer per primary binding (if primary/secondary bindings are implemented), etc.).

In one embodiment of the invention, the multiple binding units 415A-I are established as a result of AAA 408A-I. The multiple binding units establish header information based bindings with the contexts 407A-I (and thus, act as a separate flow switching module for each subscriber). In certain embodiments of the invention, the multiple binding units 415A-I establish one primary binding and a number of secondary bindings as will be discussed in greater detail in FIG. 5. According to one embodiment of the invention, one multiple binding unit is established for each subscriber session as a result of AAA 408A-I and that multiple binding unit is torn down with its virtual circuit unit when the session is ended. While in certain embodiments of the invention primary and secondary bindings are used, in alternative embodiments of the invention they are not as previously discussed.

Additionally, FIG. 4 illustrates a number of different operations for computing devices 101A and 101I. FIG. 4 illustrates a given computing device 101A and another given computing device 101I communicatively coupled to the network element 411 through access network 103 and port 104A. In FIG. 4, layer 2 demultiplexer unit 405 communicates the data packets of computing device 101A to virtual circuit unit 402A, and layer 2 demultiplexer unit 405 communicates the data packets of computing device 101I to virtual circuit unit 402I. In FIG. 4, virtual circuit unit 402A and virtual circuit unit 402I are populated through AAA 408A and AAA 408I respectively. Furthermore, in FIG. 4, virtual circuit unit 102A and virtual circuit 102I include packet analyzer 412A and 412I respectively and multiple binding units 415A and 415I respectively. FIG. 4 illustrates a point-to-multipoint configuration in that: 1) the virtual circuit unit 402A is bound to the context 407A and context 407I by the multiple binding unit 415A; and 2) the virtual circuit 402I is bound to the context 407I and 407C by multiple binding unit 415I.

It should be noted that the multiple binding units 415A-I may assign different header information values to the same context. For example, if two different subscribers through two different ISPs (internet service providers) have signed up for the same service, the multiple binding units in network element 411 for each subscriber might associate different header information values to the same context.

Figure 5:
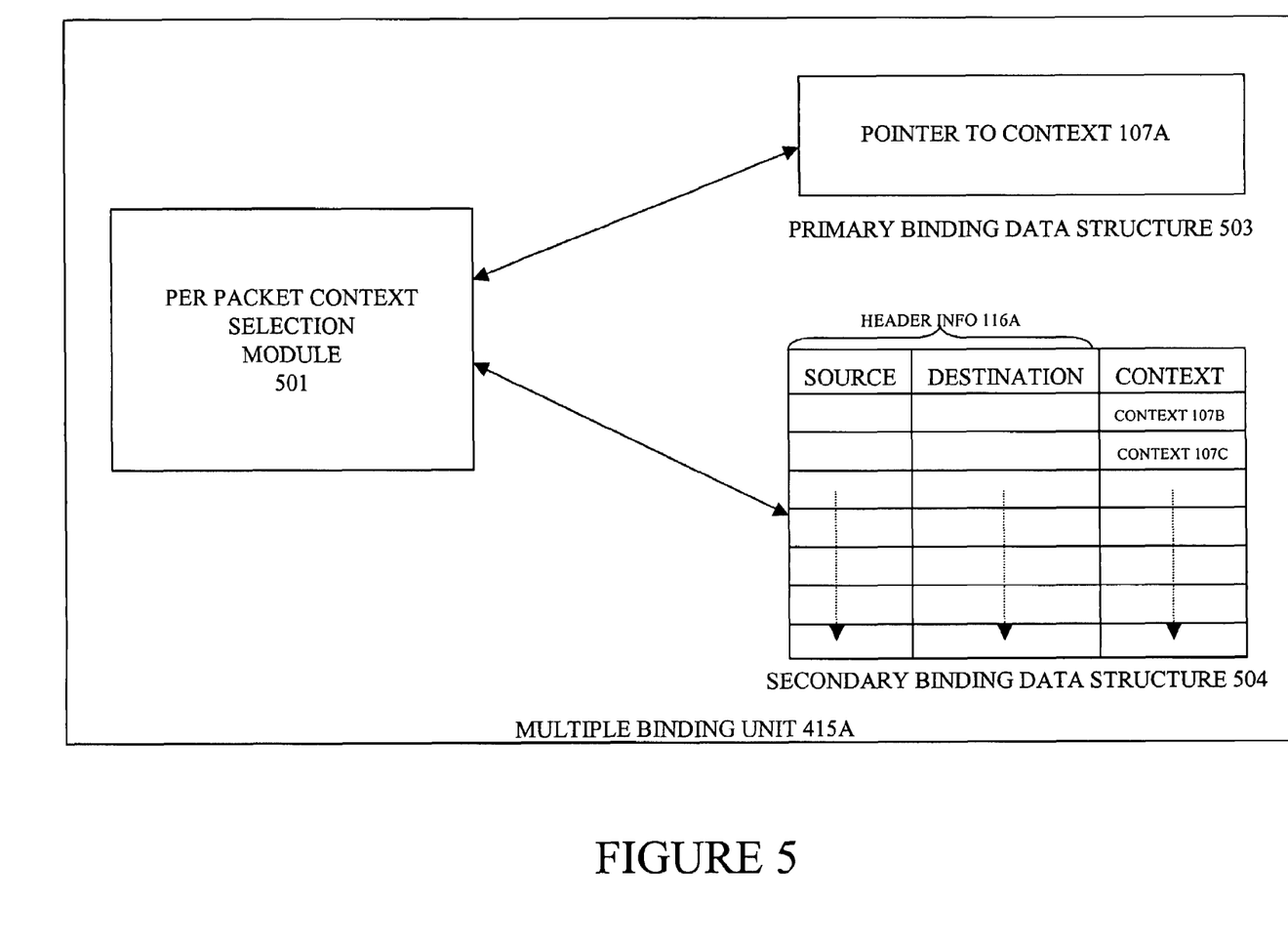
FIG. 5 is an exploded view of an exemplary multiple binding unit according to one embodiment of the invention.

FIG. 5 is an exploded view of an exemplary multiple binding unit according to one embodiment of the invention. The multiple binding unit 415A includes a per packet context selection module 501, a primary binding data structure 503, and a secondary binding data structure 504.

The per packet context selection module 501 examines header information received by the multiple binding unit 415A from the packet analyzer 412A to determine which context is associated with the header information. The per packet context selection module consults the secondary binding data structure 504 to determine if the header information received matches an entry in the secondary binding data structure 504. The secondary binding data structure 504 is to store an entry for each secondary binding established. Each entry includes: 1) fields to store header information values; and 2) reference to a context (e.g. a pointer). If there is a match, a source/destination decision is made and the packet is communicated to the appropriate context (assuming the packet passes any other operations being performed—e.g., quality of service, access control lists, etc.). If there is no match in the secondary binding data structure 504, the per packet context selection module 501 consults the primary binding data structure 503. The primary binding data structure 503 includes a reference to a primary context associated with the primary binding according to one embodiment of the invention. If there is a reference to a context in the primary binding structure, the packet is communicated to the appropriate context (assuming the packet passes any other operations being performed—e.g., quality of service, access control lists, etc.). If not, the packet is dropped.

Both the primary binding data structure 503 and the secondary binding data structure 504 might both be included in a single match table according to one embodiment of the invention. In this embodiment, the match table compares the header information received from the per packet context selection module 501 with entries in the match table. Once a match is found, the per packet context selection module might select the binding for a particular header and communicate the packet to the context associated with the selected binding. In one embodiment of the invention, the primary binding data structure 503 and the secondary binding data structure 504 are both established as a result of AAA negotiation.

Figure 6:
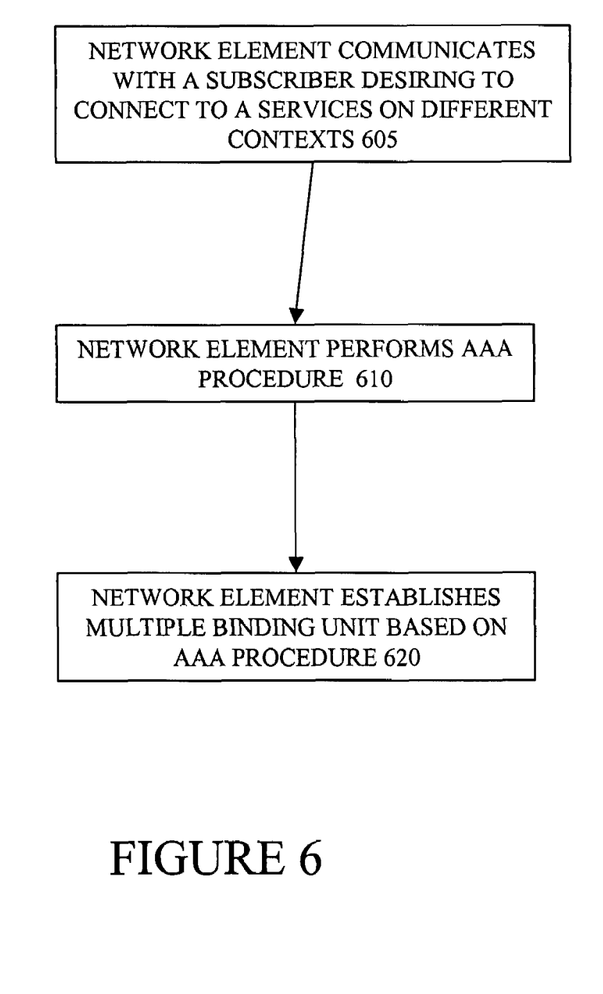
FIG. 6 is an exemplary flow chart for establishing a multiple binding unit based on AAA procedure according to one embodiment of the invention.

FIG. 6 is an exemplary flowchart for establishing a multiple binding unit based on AAA procedure. At block 605, a network element communicates with a subscriber desiring to connect to services on different contexts. At block 610, the network element performs AAA procedure. It should be understood that any number of ways could be used for performing the AAA procedure according to well-known techniques as described with reference to FIG. 2. At block 620, network element establishes the multiple binding unit based on the AAA procedure. The multiple binding unit will allow the subscriber to simultaneously access different services connected to different contexts. With reference to FIG. 4, according to one embodiment of the invention, one multiple binding unit is established for each subscriber session as a result of AAA 408A-I. When the subscriber session is complete, a multiple binding unit is torn down with its virtual circuit unit according to this embodiment. In this embodiment of the invention, the multiple binding unit might be stored in temporary memory while the subscriber session is active and then erased. With reference to FIG. 5, in certain embodiments of the invention, the multiple binding units 415A-I establish one primary binding and a number of secondary bindings.

Figure 7:
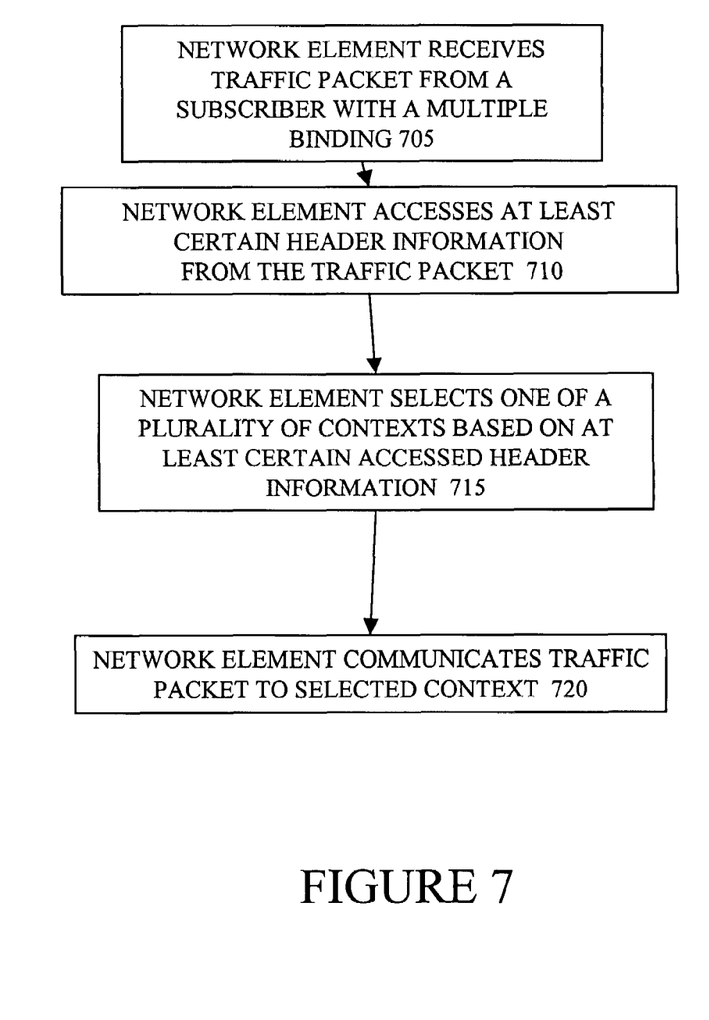
FIG. 7 is an exemplary flow chart for selecting from a plurality of contexts based on header information from a traffic packet according to one embodiment of the invention.

FIG. 7 is an exemplary flow chart for selecting from a plurality of contexts based on header information from a traffic packet according to one embodiment of the invention. At block 705, a network element receives a traffic packet from a subscriber with a multiple binding. With reference to FIG. 4, a packet analyzer 412A receives the traffic packet from the layer 2 demultiplexer unit 405. At block 710, the network element accesses at least certain header information for the traffic packet. As described with reference to FIGS. 3 and 4, certain accessed header information values may be values for one or more of the fields of a packet header (e.g., in an IP packet, the source address, the source port, the destination address, the destination port, etc.) At block 715, the network element selects one of a plurality of contexts based on at least certain accessed header information values. With reference to FIG. 4, the packet analyzer 412 provides header information to the multiple binding unit 415A. As described with reference to FIG. 4, it should be noted that the multiple binding units 415A-I may assign different header information values to the same context according to one embodiment of the invention. At block 720, the network element communicates the traffic packet to the selected context.

Figure 8:
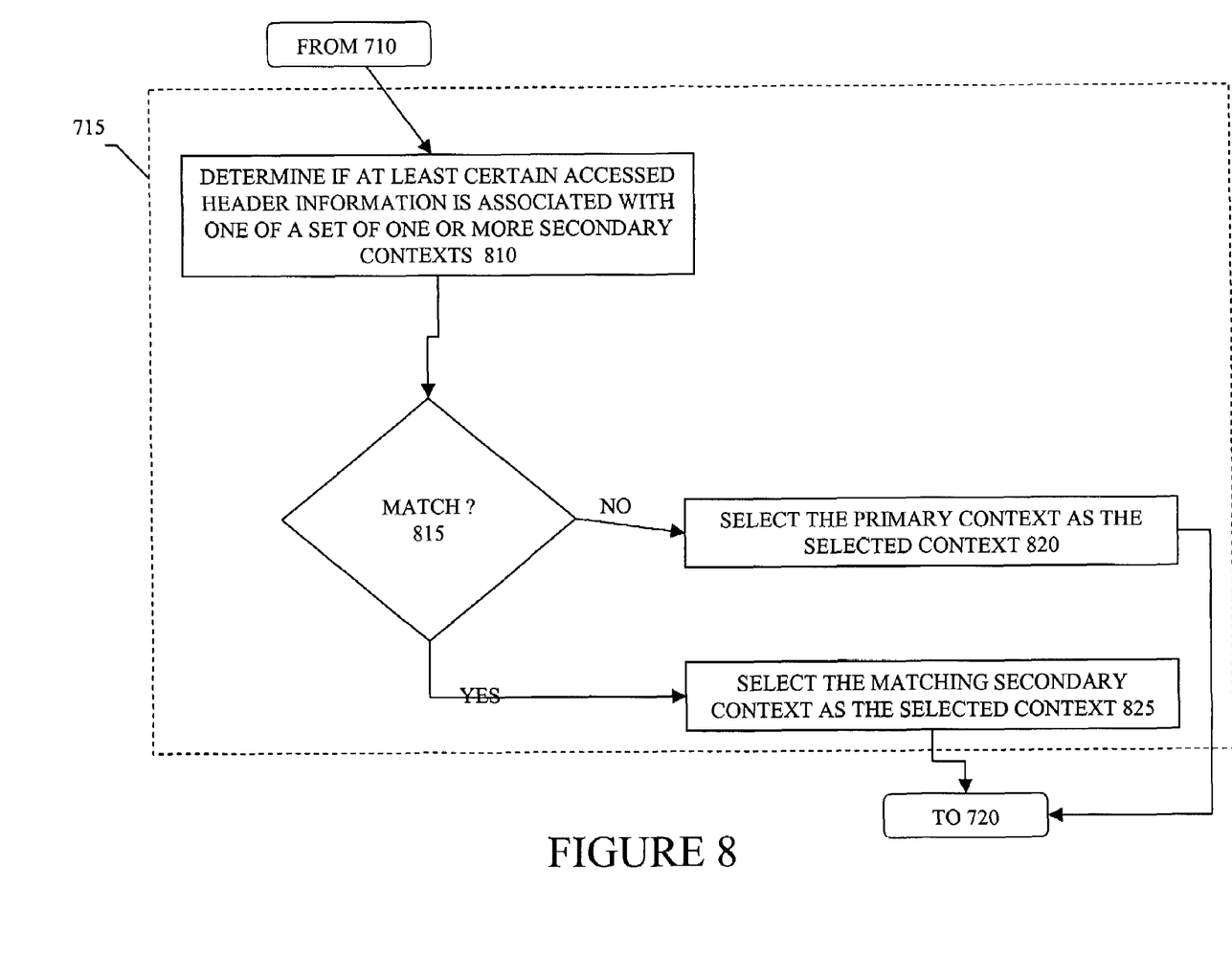
FIG. 8 is a flow chart for determining if particular header information is associated with a primary context or a secondary context according to one embodiment of the invention.

FIG. 8 is a flow chart for determining if particular header information is associated with a primary context or a secondary context according to one embodiment of the invention. This entire diagram illustrated in FIG. 8 is an exploded view of block 715 in FIG. 7. In block 810, the network element determines if at least certain accessed header information is associated with one of a set of one or more secondary contexts. As described with reference to FIG. 5, the per packet context selection module 501 examines header information received by the multiple binding unit 415A from the packet analyzer 412A to determine which context is associated with the header information according to one embodiment of the invention. In block 815, the network element determines if the header information matches one or more secondary contexts. If there is a match, the network element selects the matching secondary context as the selected context in block 825. If there is no match, the network element selects the primary context as the selected context in block 820.

Figure 9:
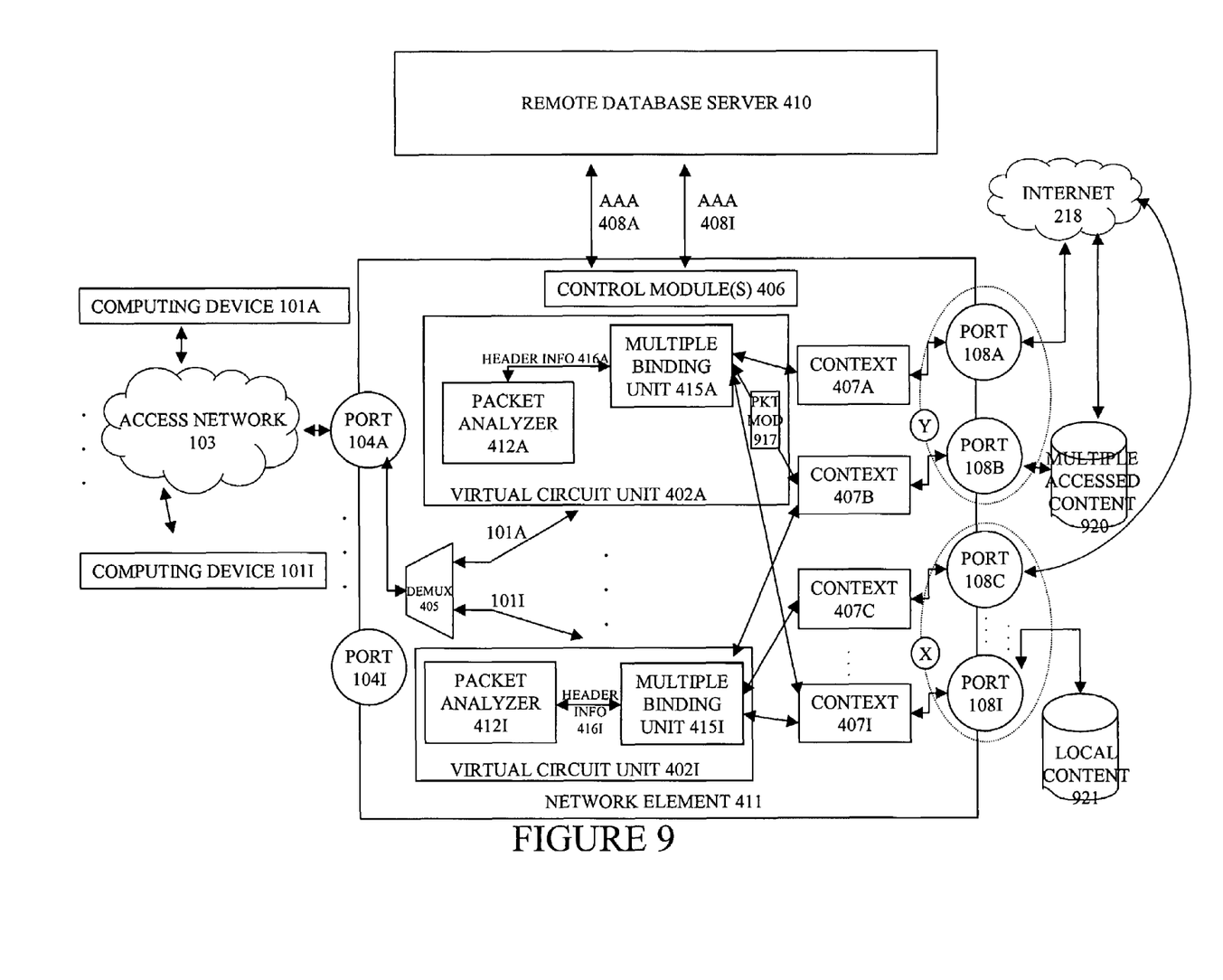
FIG. 9 illustrates an exemplary network element for establishing multiple bindings according to one embodiment of the invention.

FIG. 9 illustrates an exemplary network element including packet modification for establishing multiple bindings according to one embodiment of the invention. FIG. 9 includes all of the elements from FIG. 4, plus some additional elements. These additional elements illustrate exemplary configurations for illustration purposes, and thus other configurations are within the scope of the invention.

Two configurations are shown in FIG. 9, the first of which is circled X and the second of which is circled Y. Circled X shows a configuration in which the Internet 218 is connected to port 108C and local content 921 is connected to port 108I. The circled X approach is: 1) scalable because it does not require a NAT device; and 2) secure because the local content 921 and the Internet 218 are not accessible through the same context, and therefore local content 921 is not as susceptible to hacking through the Internet 218. Context complexity for the configuration shown in circled X is low because only one context is connected to one service. The configuration shown in circled X allows a subscriber to access both the Internet 218 and local content 921 through network element 411 without re-authenticating. As a result, simultaneous access of the Internet 218 and local content 921 is possible with this configuration. It should be noted that in some embodiments, local content 921 uses private IP addresses.

Circled Y shows a configuration in which the Internet 218 is connected to port 108A and multiple accessed content 920 is connected to port 108B. Circled Y is essentially the same as Circled X, but has a configuration in which the multiple accessed content 920 is also accessible through the Internet 218. Advantageously, this approach allows multiple accessed content 920 to be accessed either through the Internet 218 or through port 108B.

When traffic is sent from a computing device, over a binding to context 407B, to the dual access content 920, an issue arises that there may be different paths for any reply packets from the dual-accessed content to travel back on (e.g., back to context 407B or back through a different one of the contexts (e.g., 407A or 407C) over the Internet). Without some modification, it is possible that data received from the dual-accessed content 920 will select a path back through the Internet 218 due to a lack of knowledge regarding the originating path. However, in certain embodiments of the invention, a packet modification unit may be used, along with private and/or public IP addresses routed through a routing protocol to the originating context, to select the path back through the originating context.

For example, assume that contexts 407B and 407I at network element 411 connected to multiple accessed content 920 and local content 921 respectively use private IP addresses, whereas contexts 407A and 407C connected to the Internet use public IP addresses. In addition, assume that the context 407A is the primary context for computing device 101A. The context 407A may assign a public IP address to the computing device 101A (statically, dynamically, etc.). Packets sent from the computing device 101A through the context 407A/port 108A/Internet 218 to the multiple accessed content 920 will include that public source IP address, and the multiple accessed content 920 will know to reply to those packets via the same path. However, packets sent from the computing device 101A through the context 407B/port 108B to the multiple accessed content 920 would also normally have the public IP address of the computing device 101A as a source IP address, and the multiple accessed content 920 may choose to transmit reply packet back through Internet 218/port 108A/context 407A. In order to avoid taking a non-originating path back, the packet modification unit 917 converts between public IP addresses and private IP addresses. In particular, public source IP address packets sent from the computing device 101A are modified by the packet modification unit 917 such that the public source IP address is replaced with a private source IP address. Similarly, private source IP address reply packets sent from the multiple accessed content 920 through port 108B/context 407B will be modified such that the source private IP address is replaced with the public IP address of the computing device 101A. As such, packets traveling to multiple accessed content 920 through port 408B have private IP addresses, while packets traveling to multiple accessed content 920 through Internet 218 have public IP addresses. Therefore, the multiple accessed content 920 may determine, based on whether a received packet has a private or public source IP address, whether to send reply packets back through the Internet 218 or directly through port 108B.

While various techniques can be used to implement the packet modification unit 917, in one embodiment of the invention, the packet modification unit includes a match table storing IP address to IP address translations. In the above example of computing device 101A, the packet modification unit 917 would store the source public IP address assigned by context 407A associated with a private IP address assigned to the computing device 101A by the context 407B. It should be noted that in certain embodiments of the invention, the computing device 101A has no knowledge of the private IP address assigned to it by the context 407B. Rather, that private IP address is captured by the packet modification unit 917 in the virtual circuit unit 402A when it is assigned by the context 407B to the computing device 101A.

The number of manner of provision of packet modification units can be different for different embodiments of the invention. For instance, the manner of provision can include any of those described with respect to the flow switching module 309. While in the example illustrated in FIG. 9 there is a binding to a context with a packet modification unit and a binding to the same context without, alternative configurations are within the scope of the invention (e.g., all bindings to a given context have do or do not have a packet modification unit). In addition, where multiple packet modification units are use, certain embodiments allow for them to differ with different levels of granularity (e.g., on a per context basis, on a per subscriber basis, etc.).

While FIG. 9 illustrates the use of contexts for access to the Internet, local content, and multiple-accessed content, embodiments of the invention are not so limited. For example, different contexts may be established for different virtual private networks (VPN) (e.g., that are tunneled over the Internet). A multiple binding that includes such a VPN context and one or more other contexts (e.g., a context to the Internet, local content, another VPN, etc.), would allow for simultaneous access to both the VPN and the services provided by the other context(s). Similarly, embodiments of the invention may also allow for establishment of context(s) for virtual service networks (contexts that filter all HTTP traffic).

The network elements include memories, processors and/or Application Specific Integrated Circuits (ASICs). Such memory includes a machine-readable medium on which is stored a set of instructions (i.e. software) embodying any one, or all, of the methodologies described herein. Software can reside, completely or at least partially, within this memory and/or within the processor and/or ASICs. For the purposes of this specification, the term "machine-readable-medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Alternative Embodiments

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
performing authentication, authorization and accounting for a subscriber desiring to connect to a plurality of services on different contexts;
establishing bindings to a plurality of contexts for said subscriber based on said performing, wherein each of the plurality of contexts operates as a virtual router in one network element;
receiving a traffic packet from said subscriber;
accessing at least certain header information from said traffic packet;
selecting one of said plurality of contexts based on at least certain of the accessed header information, wherein said selecting comprises,
determining if at least certain accessed header information is associated with a secondary one of the bindings, wherein one of the bindings is a primary binding and the rest of the bindings are secondary bindings,
selecting one of the plurality of the contexts matching the secondary binding as the selected context if there is an association, and
selecting a primary context matching the primary binding as the selected context if there is no association; and
communicating said traffic packet to the selected context.

2. A network element, comprising:
a virtual circuit unit to receive a plurality of traffic packets from a subscriber, wherein bindings to a plurality of contexts in the network element have been established for the subscriber, and wherein each of the plurality of contexts operates as a virtual router in the network element;
a packet analyzer within the virtual circuit unit to access at least certain header information from each one of said plurality of traffic packets;
a multiple binding unit coupled to said packet analyzer to select one of the plurality of contexts for each one of said plurality of traffic packets, and to communicate each one of said plurality traffic packets to the selected one of said plurality of contexts, wherein said selection comprises,
determine if at least certain accessed header information is associated with a secondary one of the bindings, wherein one of the bindings is a primary binding and the rest of the bindings are secondary bindings,
select one of the plurality of the contexts that matches the secondary binding as the selected context if there is an association, and
select a primary context matching the primary binding as the selected context if there is no association.

3. An apparatus comprising;
a network element to receive traffic packets from a set of one or more subscribers;
a layer 2 demultiplexer unit in said network element;
a virtual circuit unit in said network element coupled to said layer 2 demultiplexer unit to perform an authentication, authorization and accounting procedure and to establish bindings to a plurality of contexts for said subscribers, wherein each of the plurality of contexts operates as a virtual router in the network element;
a packet analyzer in said virtual circuit unit to access at least certain header information from said traffic packets;
a plurality of contexts in said network element coupled to said virtual circuit unit; and
a multiple binding unit in said virtual circuit unit coupled to said packet analyzer to select one of said set of one or more contexts and to communicate said traffic packets to the selected context, wherein said selection comprises,
determine if at least certain accessed header information is associated with a secondary one of the bindings, wherein one of the bindings is a primary binding and the rest of the bindings are secondary bindings,
select one of the plurality of the contexts that matches the secondary binding as the selected context if there is an association, and
select a primary context matching the primary bindings as the selected context if there is no association.

4. A set of one or more machine-readable medium that provides instructions, which when executed by a set of one or more processors, cause said set of processors to perform operations comprising:
receiving a plurality of traffic packets from a subscriber, wherein bindings to a plurality of contexts in a network element have been established for the subscriber, and wherein each of the plurality of contexts operates as a virtual router in the network element;
accessing at least certain header information from each one of said plurality of traffic packets;
selecting different ones of the plurality of contexts for different ones of said plurality of traffic packets based on said accessing, wherein said selecting comprises,
determining if at least certain accessed header information is associated with a secondary one of the bindings, wherein one of the bindings is a primary binding and the rest of the bindings are secondary bindings,
selecting one of the plurality of the contexts matching the secondary binding as the selected context if there is an association, and selecting a primary context matching the primary binding as the selected context if there is no association; and communicating each one of said plurality traffic packets to the selected context for each one of said plurality of contexts.

5. A method for a network element, comprising:

receiving a plurality of traffic packets from a subscriber, wherein bindings to a plurality of contexts in the network element have been established for the subscriber and wherein each of the plurality of contexts operates as a virtual router in the network element;

accessing at least certain header information from each one of said plurality of traffic packets;

selecting different ones of the plurality of contexts for different ones of said plurality of traffic packets based on said accessing, wherein said selecting comprises, determining if at least certain accessed header information is associated with a secondary one of the bindings, wherein one of the bindings is a primary binding and the rest of the bindings are secondary bindings, selecting one of the plurality of the contexts matching the secondary binding as the selected context if there is an association, and selecting a primary context matching the primary binding as the selected context if there is no association; and communicating each one of said plurality traffic packets to the selected one of said plurality of contexts.

6. The method of claim 5, further comprising: performing authentication, authorization and accounting for the subscriber desiring to connect to a service.

7. A method for a network element, comprising:

receiving traffic packets from a subscriber that have differing header information, wherein bindings to a plurality of contexts in the network element have been established for the subscriber wherein each of the plurality of contexts operates as a virtual router in the network element;

selecting different ones of said plurality of contexts for different ones of said traffic packets based on the different header information, wherein said selecting a context for a traffic packet comprises, determining if header information of the traffic packet is associated with a secondary one of the bindings, wherein one of the bindings is a primary binding and the rest of the bindings are secondary bindings, selecting one of the plurality of the contexts matching the secondary binding as the selected context if there is an association, and selecting a primary context matching the primary binding as the selected context if there is no association; and communicating said traffic packets to the selected ones of said plurality of contexts.

8. The method of claim 7 further comprising: performing authentication, authorization and accounting for the subscriber desiring to connect to a service.

9. The method of claim 7, wherein the packet received via point-to-point (PPP) into the network device.

10. The method of claim 7, wherein the packet received via Dynamic Host Configuration Protocol (DHCP) into the network device.

11. The method of claim 7, further comprising:

modifying at least certain accessed header information of said packet after said determining whether the packet is destined for a primary context or a secondary context.

12. The method of claim 7, wherein the secondary context is associated with gaming content.

13. The method of claim 7, wherein the secondary context is associated with video content.

14. The method of claim 7, wherein the secondary context is associated with a virtual private network (VPN).

* * * * *